United States Patent
Harrison (10) Patent No.: US 10,804,816 B2
(45) Date of Patent: Oct. 13, 2020

(54) METHOD AND APPARATUS FOR THREE PORT LINE FREQUENCY ENERGY STORAGE

(71) Applicant: Enphase Energy, Inc., Petaluma, CA (US)

(72) Inventor: Michael J. Harrison, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 220 days.

(21) Appl. No.: 14/143,112

(22) Filed: Dec. 30, 2013

(65) Prior Publication Data

US 2014/0185345 A1 Jul. 3, 2014

Related U.S. Application Data

(60) Provisional application No. 61/747,357, filed on Dec. 30, 2012.

(51) Int. Cl.
*H02M 7/5387* (2007.01)
*H02M 7/48* (2007.01)
(Continued)

(52) U.S. Cl.
CPC ......... *H02M 7/53871* (2013.01); *H02J 7/345* (2013.01); *H02M 7/48* (2013.01);
(Continued)

(58) Field of Classification Search
CPC .. H02M 7/53871; H02M 7/5387; H02M 7/48; H02M 7/4807; H02M 7/797; H02J 7/345
See application file for complete search history.

(56) References Cited

U.S. PATENT DOCUMENTS

2002/0191429 A1* 12/2002 Nadd et al. .................... 363/132
2008/0205109 A1* 8/2008 Darroman ................. B60L 7/16
363/132
(Continued)

FOREIGN PATENT DOCUMENTS

KR 1019990070934 A 9/1999
WO WO-2006123905 A1 11/2006
(Continued)

OTHER PUBLICATIONS

PCT Search Report and Written Opinion, PCT/US2013/078195, dated Apr. 16, 2014.
(Continued)

*Primary Examiner* — Thienvu V Tran
*Assistant Examiner* — Bart Iliya
(74) *Attorney, Agent, or Firm* — Moser Taboada (57) ABSTRACT

A method and apparatus for power conversion comprising a three-port converter comprising a DC port for coupling to an external DC line, an AC port for coupling to an external AC line, and a storage port, internal to the three-port converter, for storing excess energy and discharging needed energy during power conversion, wherein the storage port is located on a DC-side of the three-port converter and is decoupled from the DC port such that a voltage on the storage port can be controlled independently of a DC voltage on the DC port.

20 Claims, 4 Drawing Sheets

(51) Int. Cl.
*H02M 7/797* (2006.01)
*H02J 7/34* (2006.01)

(52) U.S. Cl.
CPC .......... *H02M 7/797* (2013.01); *H02M 7/4807* (2013.01); *Y02B 70/1441* (2013.01)

(56) References Cited

U.S. PATENT DOCUMENTS

| | | | |
|---|---|---|---|
| 2009/0244944 A1 | 10/2009 | Jang et al. | |
| 2009/0316442 A1 | 12/2009 | Elferich | |
| 2010/0201341 A1* | 8/2010 | Chou | H02J 7/35 323/312 |
| 2010/0214808 A1* | 8/2010 | Rodriguez | 363/37 |
| 2010/0284208 A1* | 11/2010 | Nguyen | H02M 7/4807 363/160 |
| 2011/0032734 A1* | 2/2011 | Melanson | H02M 1/14 363/37 |
| 2011/0181128 A1* | 7/2011 | Perreault | H02M 7/797 307/151 |
| 2012/0081933 A1* | 4/2012 | Garrity | H02M 7/4807 363/37 |
| 2012/0294045 A1 | 11/2012 | Fornage et al. | |

FOREIGN PATENT DOCUMENTS

| | | |
|---|---|---|
| WO | WO-2007080429 A2 | 7/2007 |
| WO | WO-2011091249 A2 | 7/2011 |

OTHER PUBLICATIONS

Choi et al., "Fuel Cell Powered UPS Systems: Design Considerations", PESC '03 IEEE 34th Annual Power Electronics Specialist Conference, vol. 1, pp. 385-390, Jun. 15, 2003.

Extended European Search Report dated Mar. 8, 2017 for Application No. 13866592.2.

H. Wu et al., "Full-Bridge Three-Port Converters with Wide Input Voltage Range for Renewable Power Systems", IEEE Transactions on Power Electronics, vol. 27, No. 9, Sep. 2012, pp. 3965-3974.

B. Pierquet et al., "A Single-Phase Photovoltaic Inverter Topology with a Series-Connected Power Buffer", IEEE, 2010, pp. 2811-2818.

S. Yu et al., "Multiple-input Soft-switching Converters in Renewable Energy Applications", IEEE, 2012, pp. 1711-1718.

\* cited by examiner

METHOD AND APPARATUS FOR THREE PORT LINE FREQUENCY ENERGY STORAGE

CROSS-REFERENCE TO RELATED APPLICATION

This application claims priority to U.S. Provisional Patent Application No. 61/747,357 filed on Dec. 30, 2012, which is incorporated by reference herein in its entirety.

BACKGROUND OF THE INVENTION

Field of the Invention

Embodiments of the present disclosure relate generally to power conversion, and, in particular, to improve line frequency energy storage during power conversion.

Description of the Related Art

Resonant converters provide many advantages over other types of power converters. Such advantages may include low noise, low component stress, low component count, and predictable conduction-dominated losses. Resonant converters may therefore be smaller, less costly, and more efficient devices than other types of converters.

Figure 1:
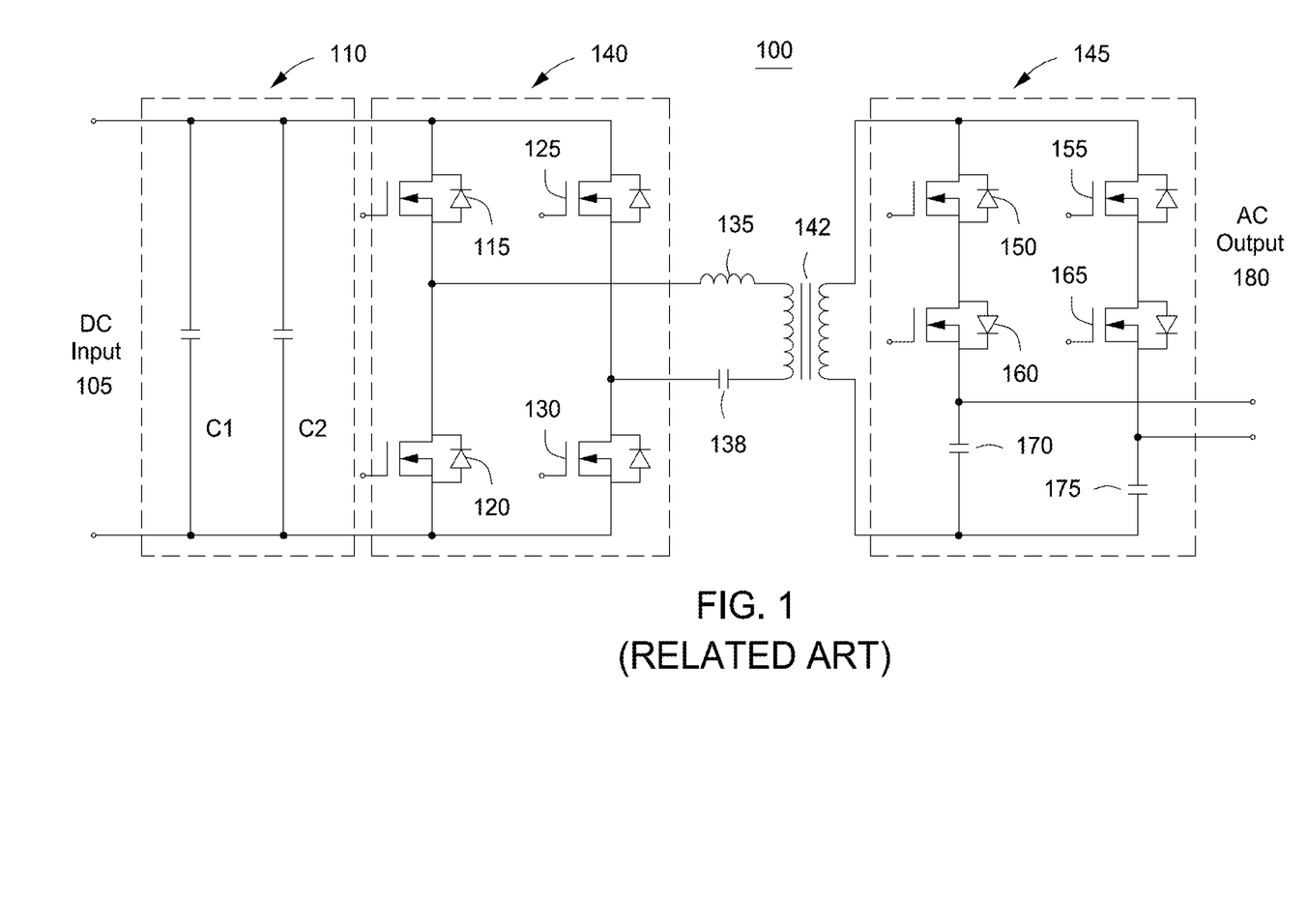
FIG. 1 is a schematic diagram of a two port resonant converter in accordance with the related art.

FIG. 1 is a schematic diagram of a two-port resonant converter 100 in accordance with the related art. The two-port resonant converter 100 includes a capacitor bank 110 comprising capacitors C1 and C2 connected in parallel. The two-port resonant converter 100 also includes a full bridge circuit 140 comprising two pairs of switches, transistors 115/120 and transistors 125/130 connected in an H-Bridge configuration. The output of the full bridge circuit 140 if coupled across a series combination of an inductor 135, a primary winding of a transformer 142, and a series capacitor 138. On the converter's secondary side, a secondary winding of the transformer 142 is coupled to an AC switching circuit 145, e.g., a cycloconverter comprising two transistors (150, 160) in series with a first capacitor 170, the combination connected in parallel with another two transistors (155, 165) in series with a second capacitor 175. An AC output 180 from the AC switching circuit 145 comprises two nodes connected respectively between each set of transistors (150/160 or 155/165) and the two capacitors (170/175).

The large capacitors C1 and C2 (e.g., 0.1 milliFarad (mF) and 16 mF) on the DC input form the main energy storage (capacitor bank 110), for this converter and are often underutilized. Such underutilization results from the fact that the voltage rating of the capacitors must be chosen based on the highest expected input voltage (e.g., Voc—the open circuit voltage of the input source) while the energy that the capacitors actually store during operation is related to the normal operational input voltage (e.g., Vmpp—the maximum power point voltage of the input source). For most renewable energy applications (photovoltaics (PV), wind turbine, hydro turbine, fuel cell, and the like), Vmpp is routinely much less than Voc. Hence the capacitors C1 and C2 on the DC input are costly, large capacitors that inefficiently store energy. The significance of the underutilization of the input energy storage capacitors can be quite substantial, and the costs and inefficiencies in the topology of the two port resonant converter 100 compound even further in larger arrays of voltage sources and converters. Furthermore, since the energy stored in any capacitor is dependent on the voltage square, any small reduction of voltage on a capacitor causes a significant reduction in the amount of energy that may be stored in the capacitor.

Therefore, there is a need in the art for a method and apparatus for efficiently converting a power utilizing a resonant converter with small energy storage capacitors.

SUMMARY OF THE INVENTION

Embodiments of the present invention generally relate to a method and apparatus for a DC/AC power converter having the bulk of energy storage decoupled from the DC input port to provide a supplemental power input that forms two separate input sources for power conversion as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments described herein are for a method and apparatus for a three-port converter with line frequency energy storage. A resonant converter comprises two DC half-bridge circuits that provide two separate DC-side inputs for power conversion. A first half-bridge circuit is coupled across the converter's DC input port and provides minimal energy storage. The second half-bridge circuit is decoupled from the converter's DC input port and provides the bulk of the line frequency energy storage. Thus, the second half-bridge circuit supplies line frequency energy storage not directly coupled to the input port, thereby allowing the majority of energy storage to be controlled independently of the DC source voltage. By splitting the full-bridge of FIG. 1 into two half-bridges to provide a third inverter port (i.e., an energy storage port) as described herein, ripple voltage at the input port as well as necessary capacitor size is reduced, that in turn, increases capacitor utilization. Additionally, the converter circuit voltages may be increased, thus reducing the circuit current and attendant losses which thereby increases overall conversion efficiency.

Varying capacitor technologies may be used within the second half-bridge to increase the amount of ripple voltage handling and increase converter robustness for particular power applications. For example, in embodiments where the converter is coupled to the AC mains, capacitor technology for the second half-bridge may be selected such that the converter may now have a very high voltage on the storage capacitor at the mains voltage peak (i.e., when drawing energy from the capacitor), and a low voltage on the capacitor at the mains zero crossing (i.e., when storing energy to the capacitor). Transistors depicted herein represent electronic switching mechanisms or otherwise switches configured to energize and de-energize in a switching operation.

Figure 2:
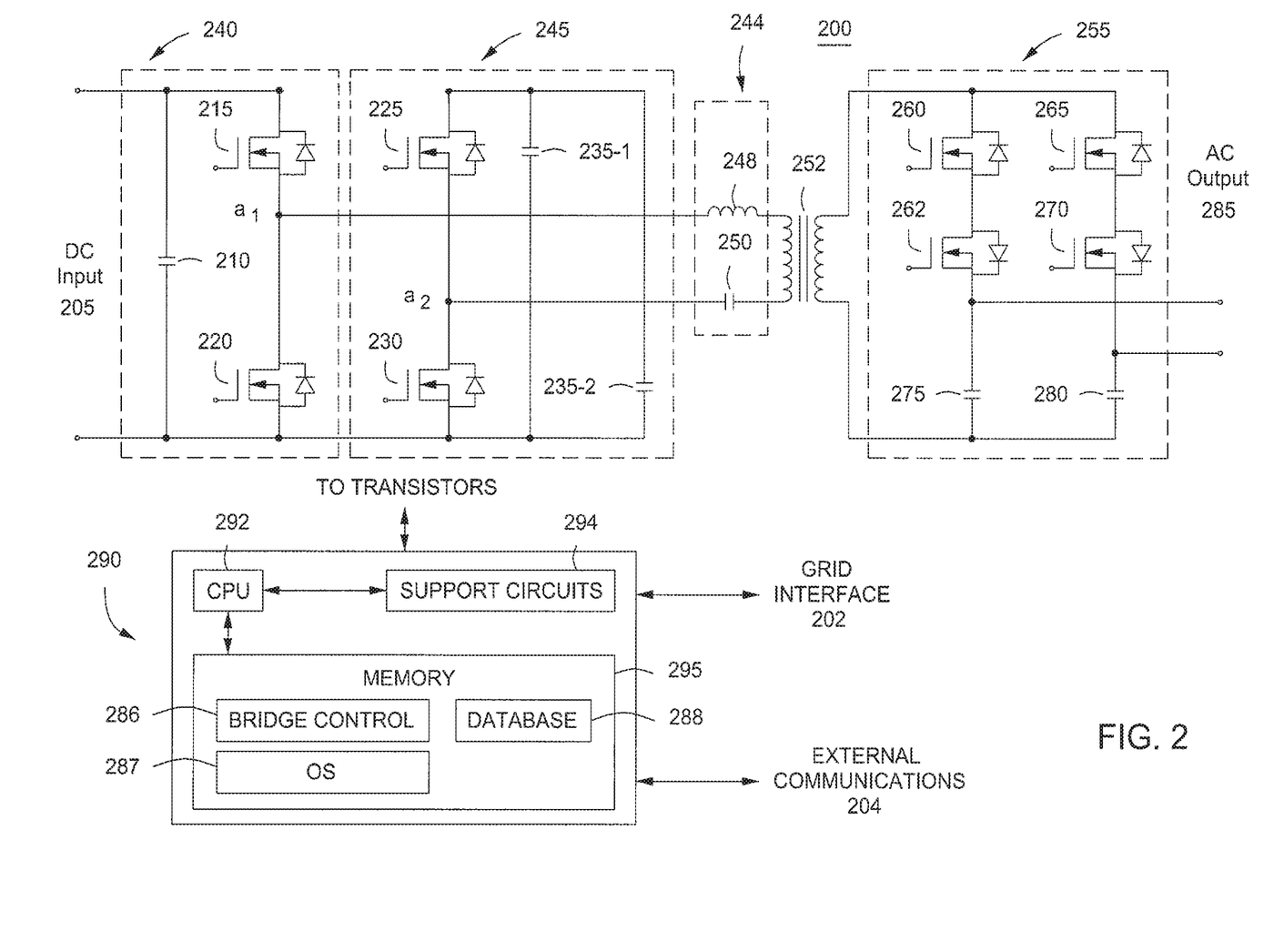
FIG. 2 is a schematic diagram of a three-port resonant converter in accordance with one or more embodiments of the present invention.

FIG. 2 is a schematic diagram of a three-port resonant converter 200 in accordance with one or more embodiments of the present invention. This diagram portrays one exemplary variation of the myriad of possible system configurations. The embodiments of the present invention can function in a variety of power generation environments and systems.

The three-port resonant converter 200 (hereinafter "converter 200") comprises an input port 205 (i.e., a DC port), a first half-bridge circuit 240, a second half-bridge circuit 245, a resonant tank circuit (hereinafter "tank circuit") 244 comprising inductor 248 and capacitor 250, transformer 252, AC switching circuit 255 and an output port 285 (i.e., an AC port). As will be discussed further below, the DC voltages across the first half-bridge circuit 240 and the second half-bridge circuit 245 are monitored and used by the controller 290 to control switching in the converter 200. The first half-bridge circuit 240, the second half-bridge circuit 245, and tank circuit 244 forming a "DC-side" of the converter 200 and the AC switching circuit 255 forming an "AC-side" of the converter 200.

The converter 200 comprises switches depicted as transistors (e.g., n-type metal-oxide-semiconductor field-effect transistors (MOSFETs) or the like). The input port 205 may be coupled to a DC source (e.g., PV module, wind turbine, batteries or the like). The input port 205 is coupled in parallel to a capacitor 210 and also to a series combination of the transistors 215 and 220 which form the first half-bridge circuit 240. The second half-bridge circuit 245 comprises transistors 225 and 230 coupled in series, and the combination is coupled in parallel to each of storage capacitor 235-1 and bypass capacitor 235-2. The storage capacitor 235-1 provides bulk energy storage for line frequency purposes. The bypass capacitor 235-2 is a high-frequency bypass capacitor (i.e., a filter).

A series combination of the inductor 248, a primary winding (i.e., a first side) of the transformer 252, and the capacitor 250 is coupled between the half-bridge circuits 240 and 245. In other words, a first terminal of the inductor 248 is coupled between transistors 215 and 220 at node a1, and a first terminal of the capacitor 250 is coupled between transistors 225 and 230 at node a2. The components form a DC voltage switching stage of the three-port resonant converter 200.

The first half-bridge circuit 240 is coupled to the second half-bridge circuit 245 at the source terminals of switches 220 and 230. Nodes a1 and a2 are respectively located in the first and second half-bridge circuits 240 and 245 between the switch pairs 215/220 and 225/230, respectively, and are coupled to each leg of the tank circuit 244. The tank circuit 244 is coupled across the primary winding of the transformer 252. Additionally, the source of the transistor 220 is coupled to the source of the transistor 230 and storage capacitor 235-1. By utilizing the two half-bridge circuits 240 and 245 coupled as previously described, the voltage on the storage capacitor 235-1 may be controlled independently of the input voltage at the input port cycle 205 and set to a fixed voltage at a safe margin below the maximum voltage rating of the storage capacitor 235-1, thus maximizing capacitor energy storage and allowing the size of the capacitors 210, storage capacitor 235-1, and bypass capacitor 235-2 (e.g., 50 microFarads (μF), 8 milliFarads (mF), and 50 μF, respectively) to be less than the size of the DC input capacitors C1 and C2 of FIG. 1 (e.g., 0.1 mF and 16 mF). The capacitors 210 and 235-2 provide high frequency bypass. Additionally, line frequency generated voltage ripple on the DC input may be completely eliminated.

The transistors 215, 220, 225, 230, 260, 262, 265, and 270 in the converter 200 are each coupled to the controller 290 and are controlled by the controller 290. Based on the DC power received at the input port 205 and the required AC power to be generated by the converter 200 the controller 290 operates the first and second half-bridge switches to store excess energy to or discharge needed energy from the storage capacitor 235-1. As such, during the power conversion cycle energy is continually flowing into or from the storage capacitor 235-1. In one exemplary embodiment as will be discussed with respect to FIG. 2 below, the controller 290 controls the converter switch operation such that the average power flow into the second half-bridge circuit 245 equals zero and the DC voltage on the second half-bridge circuit 245 is set to a predetermined voltage. This maximizes the energy storage in the storage capacitor 235-1 while providing a sufficient margin from the voltage rating of the storage capacitor 235-1 (e.g., 48V in this example). A sufficient margin, also known as a de-rating margin is applied at a range from about 10% to 20% for the capacitor such that the maximum voltage applied to the capacitor will be in the range of about 80% to 90% of the rated voltage of the capacitor. A 20% de-rating for products requiring higher reliability for adoption to consumer grade products with a lower life expectance (e.g., 3-5 years).

As a result of the storage capacitor 235-1 being decoupled from the input voltage on the input port 205, the voltage on the storage capacitor 235-1 can be controlled independent of the DC input voltage at the input port 205. Independent control over capacitor storage advantageously maintains a higher voltage for power conversion even when voltage at the input port 205 is lower than expected. For example, in an embodiment where the input port 205 is coupled to a PV module (not shown) that is temporarily shaded, a lower voltage is generated for input into the converter 200 than expected. Continuing the example, since voltage on the storage capacitor 235-1 is independently controlled, the converter 200 may compensate for the lowered DC input voltage by discharging the storage capacitor 235-1 to provide consistent input to the tank circuit 244. The controller 290 drives the converter switches such that the storage capacitor 235-1 operates in a charging or discharging period. In such an example, sensors (not shown) may be used to detect changes in current, voltage, sunlight, and the like to supply feedback signals to the controller 290 for balancing the charging and discharging of storage capacitor 235-1 and ensuring consistent DC input to the tank circuit 244.

Generally, the series capacitance of the tank circuit 244 may be on the order of 25 nanoFarad (nF) for an exemplary converter operating at 100 kHz. In some alternative embodiments, the inductor 248 may represent a leakage inductance of the transformer 252 rather than being a separate inductor, thereby reducing the overall component count of the three-port resonant converter 200. In other alternative embodiments, other types of resonant circuits (e.g., series LC, parallel LC, series-parallel LLC, series-parallel LCC, series-parallel LLCC, and the like) may be utilized within the converter 200. The transformer 252 may have any suitable turns ratio chosen in accordance to the ratio of the input and output voltages for which the converter 200 is designed to operate.

The storage capacitor 235-1 can be kept at a low value (e.g., 8 milliFarads (mF)) in the converter 200 due to decoupling of voltage from the input port 205, thus allowing the storage capacitor 235-1 size to be selected based on the converter's operating voltage irrespective of the input voltage. By separating the bridge circuit from FIG. 1 into the two half-bridge circuits 240 and 245 having respective capacitors, the controller 290 may control the voltage on the storage capacitor 235-1 and bypass capacitor 235-2 independent of the voltage at the converter's DC input port 205. Thus, the voltage on the storage capacitor 235-1 may be held at a higher voltage (e.g., 48V) when, for example, in a 60-cell PV panel the DC voltage generated for the input port 205 is 31V. The converter 200 allows the voltage on the storage capacitor 235-1 to be controlled independently of the input voltage at input port 205, and set to a fixed value at a safe margin below the maximum voltage rating (e.g., 80%) of the storage capacitor 235-1, thus maximizing the energy storage in the storage capacitor 235-1 and eliminating under-utilization. Efficiency also increases as a result of the circuit voltages being increased which reduces the circuit currents for a given power, thus reducing the attendant circuit conduction losses.

In accordance with embodiments of the present invention, the converter 200 comprises three ports: a first port for input (e.g., input port 205), a second port for output (e.g., output port 285), and a third port internal to the converter 200, for bulk energy storage (i.e., at the second half-bridge 245). The storage capacitor 235-1 and bypass capacitor 235-2 may, in some embodiments, be a single capacitor although they are depicted separately in FIG. 2 to emphasize a decrease in necessary capacitance.

In one embodiment, the first port is the DC input port 205 which couples DC input (from for example one or more PV modules) to the first half-bridge 240. The first node a1, within the first half-bridge circuit 240, supplies a "mid-point voltage", the result of complementary switching of transistors 215 and 220 from the first half-bridge circuit 240. The switching of the transistors 225 and 230 within the second half-bridge circuit 245 controls the charging and discharging of the storage capacitor 235-1 (i.e., the flow of energy to and from the third port). Outputs from the first and second half-bridges 240 and 245, (i.e., at nodes a1 and a2, are coupled to the tank circuit 244 and transformer primary winding.

Thus each leg of the primary winding respectively has its own capacitors (i.e., the first leg is coupled to the capacitor 210 for input high frequency bypass at node a1, and the second leg is coupled to the storage capacitor 235-1 and bypass capacitor 235-2 via node a2). The storage capacitor 235-1 and bypass capacitor 235-2 in some embodiments may be a capacitor technology (e.g., polymer film, multilayer ceramic, and the like) to operate with much higher ripple voltage. Higher ripple voltage on the storage capacitor 235-1 allows for a greater drive voltage to the primary winding of the transformer 252. The higher voltage means less current and thus less resistive losses on the primary side of the transformer 252. Although some losses may be passed onto the AC side of the converter 200, the overall effect is a decrease in losses.

Power generated on the converter's primary side as described above is then passed to a secondary winding (i.e., second side) of the transformer 252 and then to the AC switching circuit 255 comprised of four transistors (260, 262, 265, 270) and two capacitors (275, 280). The two transistors 260 and 262 and the capacitor 275 are coupled in series and the series combination is coupled across a series combination of the two transistors 265 and 270 and the capacitor 280. The AC switching circuit 255 outputs AC power to the output port 285 connected between the respective transistors (262 or 270) and capacitors (275 or 280). The output port 285 may be connected to an AC line, such as a commercial power grid.

Gate terminals and source terminals of each of the transistors 215, 220, 225, 230, 260, 262, 265, and 270 are coupled to the controller 290 for operatively controlling the transistors. In other embodiments, one or more of transistors 215, 220, 225, 230, 260, 262, 265, and 270 may be any other suitable electronic switch, such as insulated gate bipolar transistors (IGBTs), bipolar junction transistors (BJTs), p-type MOSFETs, gate turnoff thyristors (GTOs), and the like. The diodes depicted herein represent an intrinsic characteristic of the transistors, however, alternative embodiments may include actual diodes across the source and drain of the transistors.

The half-bridge circuits 240 and 245 operate at switching speeds depending on control logic and limited by the availability of suitable switching devices and suitable magnetic devices (i.e., inductors and transformers). Exemplary speeds may include approximately 1 kilohertz (kHz)-10 megahertz (mHz) and the half-bridge circuits 240 and 245 may switch, for example, from 60 to 600 volts depending upon the DC voltage source to the first half-bridge circuit 240; in other embodiments, the half-bridge circuits 240 and 245 may operate at different switching frequencies.

The controller 290 comprises a CPU 292 coupled to support circuits 294 and memory 295 containing, for example, instructions, data, and algorithms. The controller 290 may be comprised of hardware, software, or a combination thereof. The CPU 292 may comprise one or more conventionally available processors, microprocessors, microcontrollers, and/or combinations thereof configured to execute non-transient software instructions to perform various tasks in accordance with the present invention. The controller 290 may be implemented using a general purpose computer that, when executing particular software, becomes a specific purpose computers for performing various embodiments of the present invention. The CPU 292 processing inputs and outputs to the transistors/switches, external communications 204 (e.g., to a gateway) and a grid interface 202. Support circuits 294 are well-known circuits used to promote functionality of the CPU 292. Such circuits include, but are not limited to a cache, power supplies, clock circuits, buses, input/output circuits, and the like. Additionally, the support circuits 294 may include circuitry for sensors. Alternative embodiments may use control algorithms on a custom Application Specific Integrated Circuit (ASIC). In some embodiments, converter control techniques described herein are executed by the controller 290 may be compatible with Reactive Power Control (RPC) requirements that come from Advanced Grid Functional (AGF) requirements.

In some embodiments, such as the embodiment depicted in FIG. 2, the converter 200 generates single-phase AC output. The efficiency of the converter 200 and half-bridge circuits 240 and 245 in a single phase application is readily apparent as the converter 200 must store energy for a single half-mains cycle when coupled to an AC commercial grid (e.g., in a 60 Hz system, about 4 ms). In further embodiments, the converter 200 may generate a three phase output. Although bulk energy storage is not required for the three-phase power application, the converter 200 still benefits from a reduction in losses in such embodiments.

The memory 295 may comprise random access memory, read only memory, removable disk memory, flash memory, or various combinations of these. The memory 295 may store various forms of application software, such as a bridge control module 286 for controlling operation of the converter 200 as described herein. The bridge control module 286 may additionally perform other functions related to power conversion such as Maximum Power-Point (MPPT) functions.

In one embodiment, the controller 290 receives data from voltage and current sensors (not shown) in the converter 200 to determine if the input power is sufficient to achieve a received AC output power at output port 285. If the input power exceeds output power requirements, the controller 290 drives the converter switches to store excess energy in the storage capacitor 235-1. If power is insufficient, the bridge module 286 within memory 295 operates transistors 225 and 230 of the second half-bridge circuit 245 to discharge the storage capacitor 235-1 for additional power. The memory 295 further comprises an operating system module 287 and a database 288 for storing data, such as power control algorithms.

Some examples for single and three phase conversion are herein incorporated by reference in their entirety and may be found in commonly assigned issued patent application U.S. Pat. App. 2012/0170341 entitled "Method and Apparatus for Resonant Power Conversion" filed Jan. 3, 2012.

In one or more alternative embodiments, the converter 200 may be used in the conversion of AC to DC and thus, the converter 200 is considered to be bi-directional. AC to DC converters in computer power supplies, telecommunications infrastructure power supplies, flat-screen television power supplies, and other consumer electronics power supplies demand low output ripple voltage. Further embodiments thus include embodiments where the three ports of the converter are: an AC input (e.g. grid power at port 285), an internal bulk energy storage port (i.e., across the second half-bridge 245), and a DC output.

The topology of the three-port converter 200 reduces the undesirable ripple voltage at the converter's input (for DC-AC power conversion) or at the converter's output (for AC-DC power conversion) by decoupling the bulk energy storage from the input port 205. With smaller capacitors and reduced ripple voltage, the converter 200 thus efficiently converts power with less thermal energy waste and has a reduced component cost.

Figure 3:
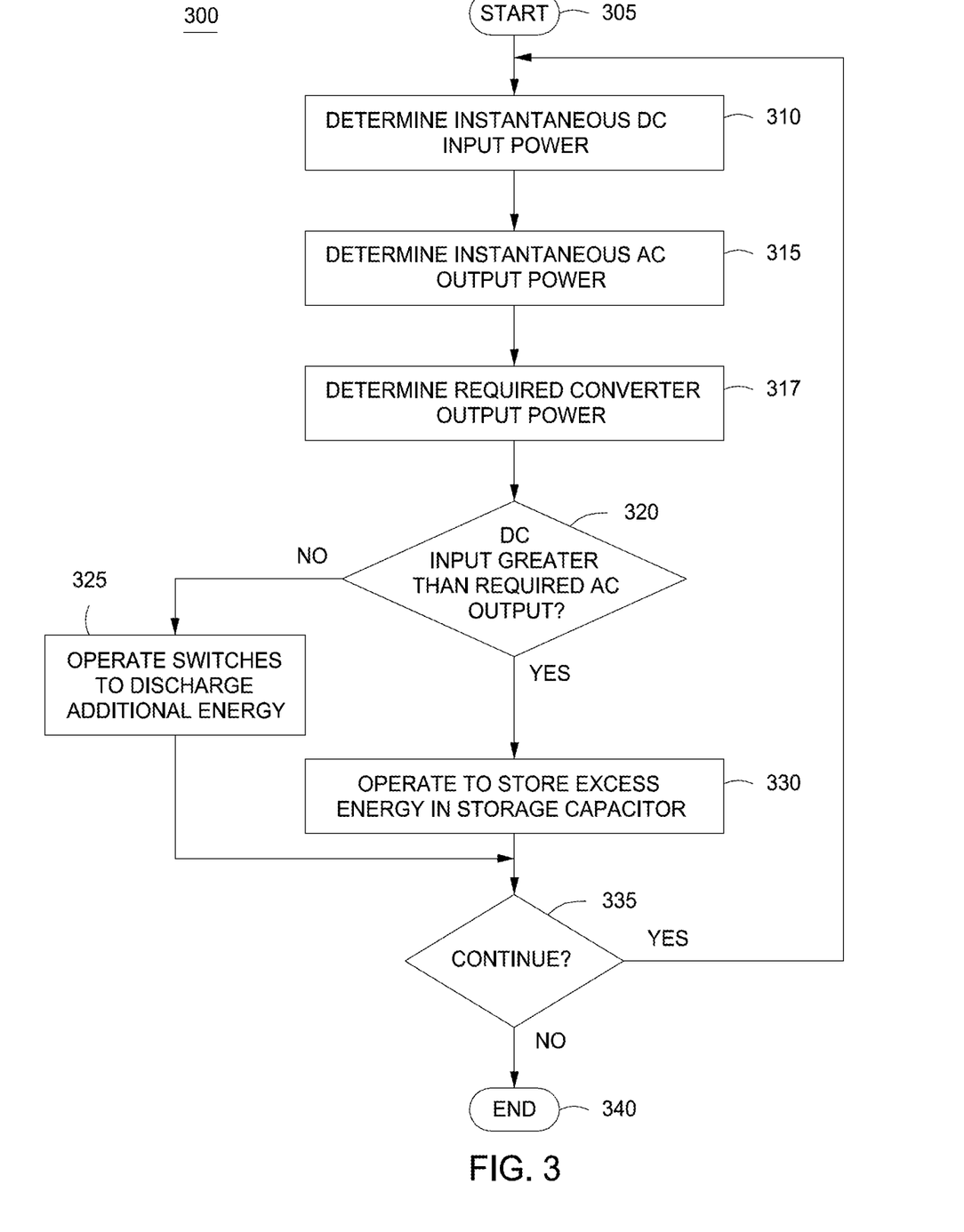
FIG. 3 is a flow diagram of a method for power conversion using three-port line frequency energy storage in accordance with one or more embodiments of the present invention.

FIG. 3 is a flow diagram of a method 300 for power conversion using three-port line frequency energy storage in accordance with one or more embodiments of the present invention. The method 300 is executed by the converter 200 and controller 290. Operating the converter 200 using the method 300 allows the converter 200 to output power even when input power is less than the requirements for the output power. The energy stored on, and discharged from the capacitor 235-1 is regulated to compensate for the instantaneous difference between the energy flowing into the converter from a coupled DC source and energy output to the AC port.

The method 300 begins at step 305 and continues to step 310 where the instantaneous DC input power received at a first port (e.g., input port 205) is determined. For example, a voltage sensor and/or current sensor may be coupled to the input port 205 to transmit a voltage and current sample for a power calculation by the controller 290. In embodiments where the converter 200 is part of a PV micro-inverter, a MPPT algorithm is applied to determine what the DC power drawn should be from the PV module coupled to the input port 205.

Next at step 315, instantaneous AC power for example is determined for example by sampling current and voltage at the second port (e.g., output port 285) and transmitting the samples to the controller 290. The power flow out to the output port 285 must be sinusoidal and if coupled for output to an AC grid, will have a power frequency equal to twice the AC line frequency. The method 300 continues to step 317.

At step 317, a required output power from the converter is determined based on the received DC power and the instantaneous AC line power. The peak AC output power is twice the average AC power and the average AC power must match the DC input power. In some embodiments, the required output power may be determined such that PV module providing the DC input is biased at its Maximum Power Point. The method 300 continues to step 320.

At step 320, the controller 290 determines whether the DC input power at the input port 205 is greater than the required AC output power. For example, half of the mains cycle (AC grid), the DC power fed into the converter 200 is higher than the instantaneous AC power being fed out of the converter 200 and during this half of the mains cycle, excess energy is stored in the storage capacitor 235-1. In the other half of the mains cycle, the instantaneous AC power output of the converter 200 is greater than the DC power fed into the converter at input port 205 and energy is discharged from the storage capacitor 235-1.

Thus, if the DC input power is insufficient to supply the required AC output, the method 300 proceeds to step 325. At step 325, the controller 290 operates switches 215, 220, 225, and 230 such that a necessary amount of energy is discharged from the storage capacitor 235-1 and coupled with the received DC power for power conversion. The method then continues to step 335 to determine whether the method 300 should continue.

If however, at step 320, a determination is made the DC input power at the input port 205 is greater than the required AC output power, the method 300 continues to step 330. At step 330, switches 215, 220, 225, and 230 are operated by the controller 290 such that excess energy is stored in the storage capacitor 235-1 and the remaining DC power is used in the power conversion. The remaining DC power comprising reduced DC input power. For example, the storage capacitor 235-1 may be held at a high voltage (e.g., 48 V). The voltage must be an average desired "set point voltage" value that is high enough to ensure sufficient energy is supplied to compensate for the difference in the DC received at the input port 205 and AC output at the output port 285. The set point voltage also must be low enough to meet desired de-rating as compared to the voltage rating of the capacitor 235-1. The method 300 then continues to step 335.

At step 335, a determination is made whether the converter should continue operating. The design of converter 200 will determine what the target set point voltage needs to be for the voltage on the storage capacitor 235-1 that is the third port and internal to the converter 200. In some embodiments, a very slow control loop compares the actual voltage on the storage capacitor 235-1 to the desired set point voltage. The comparison determines if the voltage on the storage capacitor 235-1 needs to be increased or decreased. This control loop must be slow, as there will be a voltage ripple caused by the instantaneous difference between the DC power (e.g., at input port 205) and AC power (e.g., at output port 285) on the converter 200. This natural ripple needs to be ignored and only the average voltage on the storage capacitor 235-1 (e.g., averaged over several mains cycles) should be used as the basis for the comparison with the desired set point voltage.

In some embodiments, the controller 290 effectuates a slow response by using an integral action or proportional/integral (PI) action control loop. The integral action control loop has a slow output (compared to frequency of instantaneous sampling). The slow output of the integral action is then used to generate a control signal to control the overall (average) output AC power to the output port 285. In other words, the control signal generated from the integral control loop is used to modulate the AC output power. The control for outputting AC power needs to generate a sine wave control function to effect the AC output power function—this control signal is multiplied by the output of the slow integral control loop such that the integral control loop "sets" or controls the overall magnitude of the AC sine wave control function. The net effect of this control is that the actual AC power being fed from the converter 200 at output port 285 will be continually controlled by the slow acting integral control loop to manipulate the energy flow in the three ports to ensure that the target "set point voltage" for the storage capacitor 235-1 is met. If the determination is to continue, the method 300 reverts back to step 310.

If however, the operation is to cease, the method 300 ends at step 340. In some embodiments, a determination to cease operation is based on the inability to store sufficient excess energy in the storage capacitor 235-1 to compensate for the DC input at the input port 205. In other embodiments, a determination to cease operation is based on the inability to store sufficient excess energy in the storage capacitor while maintaining the desired pre-determined de-rating value of the capacitor. In some alternative embodiments, the method 300 may be performed for AC-DC power conversion where the converter receives an AC input power from an AC line and converts the received power to a DC output power.

Figure 4:
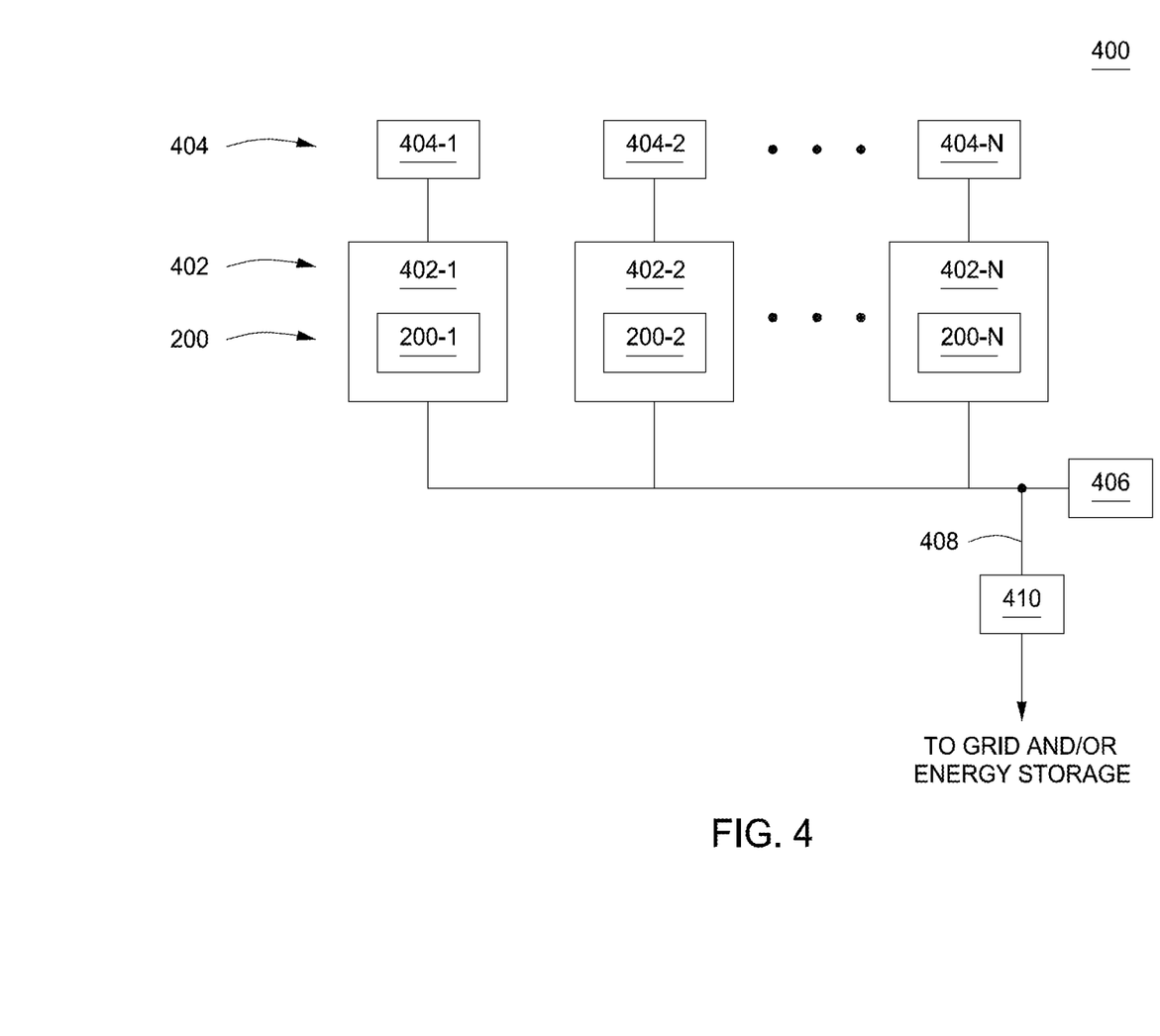
FIG. 4 is a block diagram of a system for power conversion comprising one or more embodiments of the present invention.

FIG. 4 is a block diagram of a system 400 for power conversion comprising one or more embodiments of the present invention. This diagram only portrays one variation of the myriad of possible system configurations and devices that may utilize the present invention. The present invention can be utilized in any system or device that uses a resonant converter for DC-AC or AC-DC power conversion.

The system 400 comprises a plurality of power converters 402-1, 402-2 . . . 402-N, collectively referred to as power converters 402; a plurality of DC power sources 404-1, 404-2 . . . 404-N, collectively referred to as DC power sources 404; a system controller 406; a bus 408; and a load center 410. The DC power sources 404 may be any suitable DC source, such as an output from a previous power conversion stage, a battery, a renewable energy source (e.g., a solar panel or photovoltaic (PV) module, a wind turbine, a hydroelectric system, or similar renewable energy source), or the like, for providing DC power.

Each power converter 402-1, 402-2 . . . 402-N is coupled to a single DC power source 404-1, 404-2 . . . 404-N, respectively; in some alternative embodiments, multiple DC power sources 404 may be coupled to a single power converter 402, for example a single centralized power converter 402. The power converters 402-1, 402-2 . . . 402-N comprise the converters 200-1, 200-2 . . . 200-N, respectively utilized during power conversion. Each of the converters 200-1, 200-2 . . . 200-N employs the three-port operating technique previously described with bulk energy storage formed at an internal third port in converter 200. In some embodiments, the power converters 402 may generate a single phase AC power output; in other embodiments, the power converters 402 may generate a split-phase or three-phase AC output.

The power converters 402 are coupled to the system controller 406 via the bus 408. The system controller 406 is capable of communicating with the power converters 402 by wireless and/or wired communication (e.g., power line communications) for providing operative control of the power converters 402. The power converters 402 are further coupled to the load center 410 via the bus 408.

The power converters 402 are each capable of converting the received DC power to AC power, although in other embodiments the power converters 402 may receive an AC input and convert the received input to a DC output. The power converters 402 couple the generated output power to the load center 410 via the bus 408. The generated power may then be distributed for use, for example to one or more appliances, and/or the generated energy may be stored for later use, for example using batteries, heated water, hydro pumping, $H_2O$-to-hydrogen conversion, or the like. In some embodiments, the power converters 402 convert the DC input power to AC power that is commercial power grid compliant and couple the AC power to the commercial power grid via the load center 410.

In some alternative embodiments, the power converters 402 may be DC-DC power converters. The control loop timing for storage capacitor 235-1 in such an embodiment dependent on the application and topology of the DC-DC converter.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is defined by the claims that follow.

The invention claimed is:

1. Apparatus for power conversion, comprising:
   a three-port converter comprising:
      a first half-bridge circuit, located on a DC side of the three-port converter and coupled across a DC port of the three-port converter such that the voltage across the first half-bridge circuit is equal to the voltage across the DC port;
      a second half-bridge circuit, located on the DC side and partially coupled to the first half-bridge circuit, the second half-bridge circuit comprises a second bypass capacitor;
      an AC switching circuit, located on an AC side of the three-port converter, coupled to an AC port of the three-port converter; and
      an energy storage device located on the DC side and coupled in parallel to the second bypass capacitor of the second half-bridge circuit,
      wherein the first and second half-bridge circuits are driven to control energy flow to and from the energy storage device based on measured instantaneous DC power at the DC port and measured instantaneous AC power at the AC port.

2. The apparatus of claim 1, wherein an amount of energy to be stored in or discharged from the energy storage device is determined based on a difference between the measured instantaneous DC power and the measured instantaneous AC power.

3. The apparatus of claim 1, wherein the three-port converter converts a DC input power to an AC output power.

4. The apparatus of claim 1, wherein the three-port converter converts an AC input power to a DC output power.

5. The apparatus of claim 1, wherein the second half-bridge circuit is coupled at a common node to the first half-bridge circuit.

6. The apparatus of claim 5, wherein the first half bridge circuit further comprises a first bypass capacitor, and wherein the first and the second bypass capacitors are each on the order of 50 microfarads (uF).

7. The apparatus of claim 1, wherein the energy storage device is a storage capacitor on the order of 8 millifarads (mF).

8. A method for power conversion by a resonant converter, comprising:
   determining an instantaneous DC power at a DC port of the resonant converter, the DC port coupled across a first half-bridge circuit on a DC-side of the resonant converter, wherein the first half-bridge is partially coupled to a second half-bridge circuit on the DC side, and wherein an energy storage device is located on the DC side and coupled in parallel to a second by-pass capacitor of the second half-bridge circuit;
   determining an instantaneous AC power at an AC port of the resonant converter, the AC port coupled to an AC switching circuit on an AC-side of the resonant converter; and
   operating, during conversion of an input power to the resonant converter to an output power from the resonant converter, the first and second half-bridge circuits to control energy flow to and from the energy storage device based on the determined instantaneous DC power at the DC port and the determined instantaneous AC power at the AC port.

9. The method of claim 8, further comprising determining an amount of excess energy to be stored in the energy storage device or an amount of energy to be discharged from the energy storage device based on a difference between the determined instantaneous DC power and the determined instantaneous AC power.

10. The method of claim 8, wherein the input power is the DC power at the DC port, and the output power is an AC output power.

11. The method of claim 8, wherein the input power is the AC power at the AC port, and the output power is the DC power.

12. The method of claim 8, wherein the second half-bridge circuit is coupled at a common node to the first half-bridge circuit.

13. The method of claim 8, wherein the energy storage device is a storage capacitor on the order of 8 millifarads (mF).

14. The method of claim 8, wherein the first half bridge circuit further comprises a first bypass capacitor, and wherein the first and the second bypass capacitors are each on the order of 50 microfarads (uF).

15. A system for power conversion comprising:
   a photovoltaic (PV) module; and
   a three-port converter, coupled to the PV module and to an AC line, comprising:
      a first half-bridge circuit, located on a DC side of the three-port converter and coupled across a DC port of the three-port converter such that the voltage across the first half-bridge circuit is equal to the voltage across the DC port;
      a second half-bridge circuit, located on the DC side and partially coupled to the first half-bridge circuit, the second half-bridge circuit comprises a second bypass capacitor;
      an AC switching circuit, located on an AC side of the three-port converter, coupled to an AC port of the three-port converter; and
      an energy storage device located on the DC side and coupled in parallel to the second bypass capacitor of the second half-bridge circuit, wherein the first and second half-bridge circuits are driven to control energy flow to and from the energy storage device based on measured instantaneous DC power at the DC port and measured instantaneous AC power at the AC port.

16. The system of claim 15, wherein an amount of energy to be stored in or discharged from the energy storage device is determined based on a difference between the measured instantaneous DC power and the measured instantaneous AC voltage power.

17. The system of claim 16, wherein the second half-bridge circuit is coupled at a common node to the first half-bridge circuit.

18. The system of claim 15, wherein the three-port converter converts a DC input power to an AC output power.

19. The system of claim 15, wherein the three-port converter converts an AC input power to a DC output power.

20. The system of claim 19, wherein the first half bridge circuit further comprises a first bypass capacitor, and wherein the first and the second bypass capacitors are each on the order of 50 microfarads (uF).

* * * * *